United States Patent Office 3,347,938
Patented Oct. 17, 1967

3,347,938
ANTIOXIDANT COMPOSITION
Alan Bell and Gerald R. Lappin, Kingsport, Tenn., assignors to Eastman Kodak Company, Rochester, N.Y., a corporation of New Jersey
No Drawing. Filed Apr. 23, 1964, Ser. No. 362,197
6 Claims. (Cl. 260—624)

This invention relates to antioxidants and more particularly to a new class of compounds having structure and properties which render them especially useful as antioxidants for various polyolefines such as polyethylene, polypropylene and poly-butene, paraffin wax and various other oxidizable organic materials. More especially the invention relates to a special class of 2,4,6-trialkylated phenols in which all of the alkyl groups contain long branched chains.

The use of alkylated phenols such as 2,6-di-t-butyl-p-cresol as antioxidants for polymers and other oxidizable organic materials is well known in the art. The substances can be represented by the following structure:

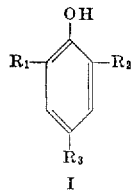

I

Past experience has shown that $R_1$ and, often, $R_2$ must be tertiary alkyl groups to make I a potent antioxidant. On the other hand, it has been generally agreed that $R_3$ must be either methyl or hydrogen or the potency is greatly decreased. For example, although 2,6-di-t-butyl-p-cresol ($R_1=R_2=$t-butyl, $R_3=CH_3$) and 2,6-di-t-butyl-phenol ($R_1=R_2=$t-butyl, $R_3=$H) are quite effective antioxidants, 2,4,6-tri-t-butylphenol ($R_1=R_2=R_3=$t-butyl) is almost completely ineffective. Thus it would be totally unexpected that compounds such as II (below) would be effective antioxidants. Not only are $R_1$ and $R_2$ in this structure not tertiary but $R_3$ is a long alkyl group. From all past experience such a compound would be expected to be relatively inactive as an antioxidant.

We have now made the surprising discovery that compounds having structure II wherein the three substituents are all long secondary alkyl groups are unexpectedly potent antioxidants in a wide variety of oxidizable organic substances. Such compounds are represented by the structural formula:

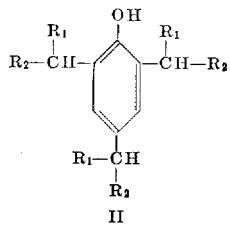

II wherein $R_1=CH_3$, $C_2H_5$, $C_3H_7$ straight chain alkyl groups and $R_2=C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$ straight chain alkyl groups and wherein $R_1+R_2=C_{11}H_{24}$ to $C_{19}H_{40}$ and consist of saturated alkyl groups. Furthermore, we have made the equally surprising discovery that analogs of structure II in which the substituent alkyl groups are tertiary such as Compound III (below) are almost completely ineffective as antioxidants:

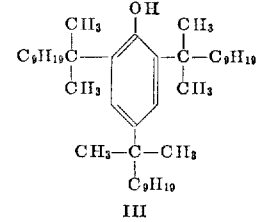

III

It is accordingly the principal object of the present invention to provide a new class of antioxidants having structures and properties which render them especially useful as antioxidants for various polyolefines such as polyethylene, polypropylene and polybutylene, paraffin wax and various other oxidizable organic materials.

Another object is to provide a new class of alkylated phenols useful as antioxidants for the materials referred to in the preceding paragraph.

A specific object is to provide a new class of highly effective antioxidants 2,4,6-trialkylated phenols in which all of the alkyl groups contain long branched chains which are saturated alkyl groups.

Other objects will appear hereinafter.

These objects are accomplished by the invention described herein and illustrated by the examples that follow. In its broad aspects and as set forth above, the invention is based upon the discovery that when all three substituent groups of 2,4,6-trialkyl phenols are long secondary alkyl groups these alkylated phenols have remarkable antioxidant potency when employed in polymeric substances such as polyethylene, polypropylene, polybutylene, paraffin waxes and other oxidizable organic materials which are subject to oxidative decomposition and degradation especially under thermal influences. As indicated above, our new antioxidants are 2,4,6-trialkylated phenols which may be represented by the structural formula:

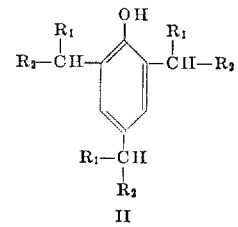

II wherein $R_1=CH_3$, $C_2H_5$, $C_3H_7$ straight chain alkyl groups and $R_2=C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$ straight chain alkyl groups and wherein $R_1+R_2=C_{11}H_{24}$ to $C_{19}H_{40}$ and consist of saturated alkyl groups.

We believe our new antioxidants to be largely the structure predicted from the following equation:

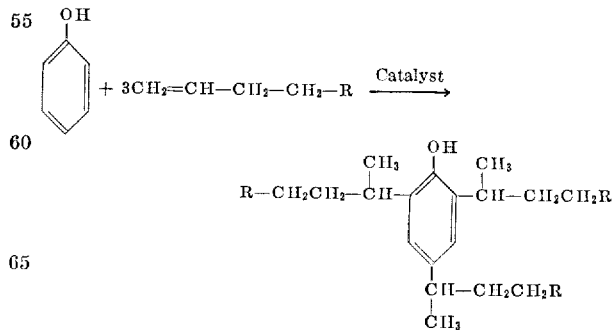

wherein R is an alkyl group.

However, it is well-known that Friedel-Crafts catalysts such as aluminum chloride, boron trifluoride and the like may promote a double-bond shift of 1-olefins to give 2-olefins, 3-olefins and the like according to the following equation:

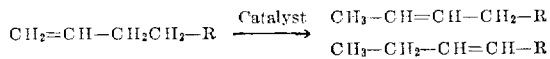

etc.

This rearrangement would result in the formation of some proportion of alkylated phenol in which some or all of the substituent groups would have structures such as

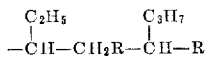

etc.

Therefore, we do not preclude the possibility that the antioxidants herein described are mixtures of isomeric compounds differing in the configuration about the α-carbon atom of the substituent alkyl groups. However, such isomers would all contain only secondary alkyl substitution and would be described by structure II. Present analytical techniques are incapable of separating such isomers or demonstrating unequivocally their presence or absence in our new antioxidants.

In the following examples and description we have set forth several of the preferred embodiments of our invention but they are included merely for purposes of illustration and not as a limitation thereof.

EXAMPLE I

*Preparation of 2,4,6-tris(1-methylheptadecyl)phenol*

Boron trifluoride gas was passed into 94 g. (1.0 mole) of phenol until 12 g. had been absorbed. The mixture was then heated to 85° C. and to it was added over 45 minutes 762 g. (3.0 moles) of 1-octadecene. The temperature was held at 82–85° C. by heating as required. Heating at this temperature was continued for an additional 2 hours. The mixture was then cooled and dissolved in 1 l. of hexane. The hexane solution was washed once with 1 l. of water, twice with 5 percent aqueous sodium acetate and twice more with water. The hexane was evaporated and the residue stripped under vacuum to a base temperature of 260° C. at 1 mm. pressure. The residue was molecularly distilled in a falling film still to give 710 g. of amber moderately viscous oil, distilling at 217–220 at 1 micron pressure which has a molecular weight of 830 and was identified as 2,4,6-tris(1-methylheptadecyl) phenol ($C_{60}H_{114}O$, calculated molecular weight 856).

EXAMPLE II

*Preparation of 2,4,6-tris(1-methylnonadecyl)phenol*

Following the method of Example I, 94 g. (1.0 mole) of phenol was alkylated with 840 g. (3.0 moles) of 1-eicosene. After isolation as in Example I molecular distillation gave 850 g. of viscous amber oil distilling at 235–250° C. at 1 micron and having a molecular weight of 895. The molecular weight calculated for $C_{66}H_{126}O$ is 934.

EXAMPLE III

*Preparation of 2,4,6-tris(1-methylundecyl)phenol.*

Following the same procedure as in Examples I and II, 94 g. (1.0 mole) of phenol was alkylated with 504 g. (3.0 moles) of 1-dodecene. The product, isolated and purified as before, was an amber viscous oil, B.P. 160–170° at 2 microns. The molecular weight was found to be 585. The calculated molecular weight for $C_{38}H_{78}O$ is 598.

The compounds of our invention were tested for antioxidant effectiveness in a number of polymeric substances subject to decomposition or degradation under oxidative influences and were found to be extremely effective. A description of such tests and the results obtained are set forth below.

*Antioxidant effectiveness of compounds in polypropylene*

The subject antioxidants were incorporated in polypropylene at the 0.3 percent level by milling in a Banbury mixer. These samples, in the form of approximately ⅛ inch thick strips, were evaluated by the 160° C.-oven test and 140° C. stress crack test. The 160 C.-oven test is carried out by exposing the samples in an air oven at 160° C. until the first appearance of peroxide as shown by the usual iodometric test. In the stress crack test the samples are bent in the shape of a U by inserting in a slotted metal holder and then exposed in an air oven at 140° C. until visual examination shows the presence of surface-cracks. The results of these tests are shown in Table 1.

TABLE 1

| Antioxidant | 160° Oven Life, hrs. | 140° Stress Crack Life, hrs. |
|---|---|---|
| None | 0.3 | 3 |
| 0.3% 2,4,6-tris(1-methylnonadecyl) phenol | 6 | 22 |
| 0.3% 2,4,6-tris(1-methylheptadecyl) phenol | 4 | 15 |
| 0.3% 2,4,6-tris(1-methyltridecyl) phenol | 4 | 13 |
| 0.3% 2,4,6-tris(1-methylundecyl) phenol | 2 | 10 |
| 0.3% $C_{16}$-$C_{20}$ trisalkylated phenol [1] | 4 | 14 |
| 0.3% 2,4,6-tri-t-butyl phenol | 0.4 | 3 |
| 0.3% propylenetetramer trisalkylated phenol [2] | 0.5 | 4 |
| 0.3% i-butylenetrimer trisalkylated phenols [3] | 0.3 | 3 |

[1] Alkylated with Enjay Chemicals Company α-olefin mixture containing about equal quantities of 1-hexadecene, 1-heptadecene, 1-octadecene, 1-nonadecene and 1-eicosene.
[2] See Structure III.
[3] Similar to Structure III, i.e., all alkyl groups are tertiary $C_{12}H_{25}$-branched alkyls.

*Antioxidant effectiveness of compounds in polyethylene*

The subject antioxidants were incorporated in polyethylene at the 0.5 percent level by milling as described for polypropylene. Samples were evaluated by exposure in an air oven at 160° C. until an increase in peroxide concentration occured. The results are reported in Table 2.

TABLE 2

Antioxidant: 160° C. oven life hrs.
  None _____ 2
  0.3% 2,4,6-tris(1-methylnonadecyl) phenol ____ 25
  0.3% 2,4,6-tris(1-methylpentadecyl) phenol ____ 20
  0.3% 2,4,6-tris(1-methylundecyl) phenol _____ 18
  0.3% 2,4,6-tri-t-butyl phenol _____ 2
  0.3% propylenetetramer trisalkylated phenol [1] __ 3

[1] See Structure III.

*Antioxidant effectiveness of compounds in poly-1-butene*

The subject antioxidants were incorporated in poly-1-butene by milling. Samples were evaluated by the 160° C. oven test as described above. The results are summarized in Table 3.

TABLE 3

Antioxidant: 160° C. oven life hrs.
  None _____ 0.25
  1% 2,4,6-tris(1-methylheptadecyl) phenol ____ 5
  1% 2,4,6-tris(1-methyltetradecyl) phenol ____ 5
  1% 2,4,6-tris(1-methylundecyl) phenol _____ 3
  1% 2,4,6-tri-t-butyl phenol _____ 0.3
  1% propylenetetramer trisalkylated phenol [1] __ 0.4

[1] See Structure III.

*Antioxidant effectiveness of compounds in a 1 to 1 copolymer of propylene and 1-butene*

The antioxidants were incorporated and evaluated as previously described using the 160° C. oven test. The results are summarized in Table 4.

TABLE 4

| Antioxidant: | 160° C. oven life hrs. |
|---|---|
| None | 0.4 |
| 1% 2,4,6-tris(1-methylheptadecyl) phenol | 7 |
| 1% 2,4,6-tris(1-methylundecyl) phenol | 5 |
| 1% 2,4,6-tri-t-butyl phenol | 0.4 |
| 1% propylenetetramer trisalkylated phenol [1] | 0.4 |

[1] See Structure III.

*Antioxidant effectiveness of compounds in paraffin wax*

The subject antioxidants were incorporated in paraffin wax at the 0.05 percent level by mixing with the molten wax. Air was bubbled through the molten wax at the rate of 2.33 ml./sec. at 150° C. and the time required for the build up in peroxide to 20 milliequivalents per kilogram was reported as the AOM value. The results are tabulated in Table 5.

TABLE 5

| Antioxidant: | AOM value hrs. |
|---|---|
| None | 3 |
| 0.05% 2,4,6-tris(1-methylheptadecyl) phenol | 180 |
| 0.05% 2,4,6-tris(1-methylundecyl) phenol | 110 |
| 0.05% 2,4,6-tri-t-butylphenol | 8 |
| 0.5% propylenetetramer trisalkylated phenol [1] | 4 |

[1] See Structure III.

The data presented in the above tables show conclusively the unexpected superiority of the secondary-alkyl substituted phenols of this invention over their tertiary-alkyl substituted analogs, which are, in fact, shown to be unexpectedly inactive as antioxidants in the various media disclosed.

Although the invention has been described in considerable detail with particular reference to certain preferred embodiments thereof, variations and modifications can be effected within the spirit and scope of the invention as described hereinabove, and as defined in the appended claims.

We claim:

1. A new class of chemical compounds having antioxidant properties having the structural formula:

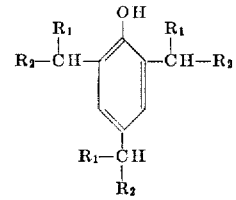

wherein
$R_1 = CH_3$, $C_2H_5$, $C_3H_7$ straight chain alkyl groups and
$R_2 = C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$ straight chain alkyl groups and wherein the sum total of the carbon and hydrogen atoms of the $R_1 + R_2$ moieties is in the range of from $C_{11}H_{24}$ to $C_{19}H_{40}$.

2. The compounds of claim 1 in which the sum total of the carbon and hydrogen atoms of the $R_1 + R_2$ moieties is $C_{17}H_{35}$.

3. The compounds of claim 1 wherein the sum total of the carbon and hydrogen atoms of the $R_1 + R_2$ moieties is $C_{15}H_{31}$.

4. 2,4,6-tris(1-methylheptadecyl)phenol.
5. 2,4,6-tris(1-methylpentadecyl)phenol.
6. 2,4,6-tris(1-methylnonadecyl) phenol.

References Cited
UNITED STATES PATENTS
2,202,877  6/1940  Stevens _____ 260—624

LEON ZITVER, *Primary Examiner.*

BERNARD HELEFIN, *Examiner.*

W. B. LONE, *Assistant Examiner.*

UNITED STATES PATENT OFFICE
CERTIFICATE OF CORRECTION

Patent No. 3,347,938                                October 17, 1967

Alan Bell et al.

It is hereby certified that error appears in the above numbered patent requiring correction and that the said Letters Patent should read as corrected below.

Column 4, TABLE 1, footnote 3, line 2 thereof, for $C_{42}H_{25}-$ read $C_{12}H_{25}-$ Signed and sealed this 17th day of December 1968.

(SEAL)
Attest:

Edward M. Fletcher, Jr.                                EDWARD J. BRENNER
Attesting Officer                                          Commissioner of Patents